(12) United States Patent
Alfano

(10) Patent No.: US 8,107,377 B2
(45) Date of Patent: *Jan. 31, 2012

(54) REORDERING PACKETS

(75) Inventor: Vic Alfano, Santa Monica, CA (US)

(73) Assignee: Bunson Bell, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/759,221

(22) Filed: Apr. 13, 2010

(65) Prior Publication Data

US 2010/0189123 A1 Jul. 29, 2010

Related U.S. Application Data

(63) Continuation of application No. 11/237,482, filed on Sep. 27, 2005, now Pat. No. 7,856,011, which is a continuation of application No. 10/044,244, filed on Jan. 11, 2002, now Pat. No. 6,967,951.

(51) Int. Cl.
*H04L 12/26* (2006.01)
(52) U.S. Cl. ......................... 370/235; 370/394
(58) Field of Classification Search .................. 370/229, 370/231, 235, 389, 360, 374, 368, 381, 382, 370/386, 371, 383, 395, 395.42
See application file for complete search history.

(56) References Cited

U.S. PATENT DOCUMENTS

| | | | |
|---|---|---|---|
| 4,330,824 A | 5/1982 | Girard | |
| 4,344,132 A | 8/1982 | Dixon et al. | |
| 4,394,725 A | 7/1983 | Bienvenu | |
| 4,704,606 A | 11/1987 | Hasley | |
| 4,740,954 A | 4/1988 | Cotton | |
| 4,754,451 A | 6/1988 | Eng | |
| 4,958,299 A | 9/1990 | Akada | |
| 5,127,000 A | 6/1992 | Henrion | |
| 5,260,935 A * | 11/1993 | Turner | 370/394 |
| 5,406,554 A | 4/1995 | Parry | |
| 5,412,646 A | 5/1995 | Cyr et al. | |
| 5,521,923 A | 5/1996 | Willmann et al. | |
| 5,550,823 A | 8/1996 | Irie | |
| 5,555,543 A | 9/1996 | Grohoski | |
| 5,606,370 A | 2/1997 | Moon | |
| 5,610,914 A | 3/1997 | Yamada | |
| 5,659,713 A | 8/1997 | Goodwin | |

(Continued)

OTHER PUBLICATIONS

USPTO; Office Action dated Dec. 14, 2004 in U.S. Appl. No. 09/930,804.

(Continued)

*Primary Examiner* — Brenda H Pham
(74) *Attorney, Agent, or Firm* — Snell & Wilmer L.L.P.

(57) ABSTRACT

There are disclosed processes and apparatus for reordering packets. The system includes a plurality of source processors that transmit the packets to a destination processor via multiple communication fabrics. The source processors and the destination processor are synchronized together. Time stamp logic at each source processor operates to include a time stamp parameter with each of the packets transmitted from the source processors. The system also includes a plurality of memory queues located at the destination processor. An enqueue processor operates to store a memory pointer and an associated time stamp parameter for each of the packets received at the destination processor in a selected memory queue. A dequeue processor determines a selected memory pointer associated with a selected time stamp parameter and operates to process the selected memory pointer to access a selected packet for output in a reordered packet stream.

35 Claims, 4 Drawing Sheets

U.S. PATENT DOCUMENTS

| | | | |
|---|---|---|---|
| 5,818,839 | A | 10/1998 | Sterne et al. |
| 5,845,145 | A | 12/1998 | James |
| 5,859,835 | A * | 1/1999 | Varma et al. .................. 370/229 |
| 5,860,085 | A | 1/1999 | Stormon |
| 5,884,099 | A | 3/1999 | Klingelhofer |
| 5,892,979 | A | 4/1999 | Shiraki et al. |
| 5,898,689 | A | 4/1999 | Kumar |
| 5,905,911 | A | 5/1999 | Shimizu |
| 5,909,440 | A | 6/1999 | Ferguson |
| 5,923,893 | A | 7/1999 | Moyer |
| 5,961,626 | A | 10/1999 | Harrison |
| 5,974,516 | A | 10/1999 | Qureshi |
| 5,982,749 | A | 11/1999 | Daniel |
| 6,026,092 | A | 2/2000 | Abu-Amara |
| 6,067,408 | A | 5/2000 | Runaldue et al. |
| 6,092,150 | A | 7/2000 | Sokolov et al. |
| 6,122,674 | A | 9/2000 | Olnowich |
| 6,145,068 | A | 11/2000 | Lewis |
| 6,172,927 | B1 | 1/2001 | Taylor |
| 6,192,465 | B1 | 2/2001 | Roberts |
| 6,246,684 | B1 | 6/2001 | Chapman |
| 6,256,315 | B1 | 7/2001 | Barbas et al. |
| 6,292,878 | B1 | 9/2001 | Morioka |
| 6,389,489 | B1 | 5/2002 | Stone |
| 6,438,134 | B1 | 8/2002 | Chow et al. |
| 6,442,674 | B1 | 8/2002 | Lee et al. |
| 6,460,120 | B1 | 10/2002 | Bass |
| 6,487,171 | B1 | 11/2002 | Honig |
| 6,493,347 | B2 | 12/2002 | Sindhu |
| 6,510,138 | B1 | 1/2003 | Pannell |
| 6,557,053 | B1 | 4/2003 | Bass et al. |
| 6,570,876 | B1 | 5/2003 | Aimoto |
| 6,574,194 | B1 | 6/2003 | Sun et al. |
| 6,611,527 | B1 | 8/2003 | Moriwaki |
| 6,658,503 | B1 | 12/2003 | Agarwala et al. |
| 6,687,768 | B2 | 2/2004 | Horikomi |
| 6,708,262 | B2 | 3/2004 | Manning |
| 6,735,647 | B2 | 5/2004 | Boyd |
| 6,754,741 | B2 | 6/2004 | Alexander et al. |
| 6,795,870 | B1 | 9/2004 | Bass |
| 6,907,041 | B1 | 6/2005 | Turner et al. |
| 6,941,426 | B2 | 9/2005 | Haywood |
| 6,944,688 | B1 | 9/2005 | Batcher |
| 6,967,951 | B2 * | 11/2005 | Alfano .......................... 370/394 |
| 7,856,011 | B2 * | 12/2010 | Alfano .......................... 370/383 |
| 2001/0037435 | A1 | 11/2001 | Van Doren |
| 2002/0054602 | A1 | 5/2002 | Takahashi |
| 2002/0061022 | A1 | 5/2002 | Allen |
| 2002/0099855 | A1 | 7/2002 | Bass |
| 2002/0122386 | A1 | 9/2002 | Calvignac |
| 2002/0165947 | A1 | 11/2002 | Akerman |
| 2003/0035427 | A1 | 2/2003 | Alasti |
| 2003/0214949 | A1 | 11/2003 | Shaikli |

OTHER PUBLICATIONS

USPTO; Final Office Action dated May 3, 2005 in U.S. Appl. No. 09/930,804.
USPTO; Notice of Allowance dated Aug. 23, 2005 in U.S. Appl. No. 09/930,804.
USPTO; Office Action dated Sep. 16, 2003 in U.S. Appl. No. 10/039,953.
USPTO; Final Office Action dated May 25, 2004 in U.S. Appl. No. 10/039,953.
USPTO; Advisory Action dated Aug. 25, 2004 in U.S. Appl. No. 10/039,953.
USPTO; Office Action dated Dec. 21, 2004 in U.S. Appl. No. 10/039,953.
USPTO; Notice of Allowance dated Apr. 5, 2005 in U.S. Appl. No. 10/039,953.
USPTO; Office Action dated Dec. 17, 2008 in U.S. Appl. No. 11/237,481.
USPTO; Notice of Allowance dated Sep. 4, 2009 in U.S. Appl. No. 11/237,481.
USPTO; Office Action dated May 17, 2007 in U.S. Appl. No. 11/202,475.
USPTO; Final Office Action dated Nov. 28, 2007 in U.S. Appl. No. 11/202,475.
USPTO; Office Action dated Apr. 18, 2008 in U.S. Appl. No. 11/202,475.
USPTO; Final Office Action dated Oct. 15, 2008 in U.S. Appl. No. 11/202,475.
USPTO; Advisory Action dated Jan. 30, 2009 in U.S. Appl. No. 11/202,475.
USPTO; Office Action dated Apr. 2, 2009 in U.S. Appl. No. 11/202,475.
USPTO; Final Office Action dated Nov. 24, 2009 in U.S. Appl. No. 11/202,475.
USPTO; Advisory Action dated Feb. 19, 2010 in U.S. Appl. No. 11/202,475.
USPTO; Notice of Allowance dated Aug. 10, 2005 in U.S. Appl. No. 10/044,244.
USPTO; Office Action dated Aug. 12, 2008 in U.S. Appl. No. 11/237,482.
USPTO; Final Office Action dated Nov. 3, 2009 in U.S. Appl. No. 11/237,482.
USPTO; Notice of Allowance dated Jan. 14, 2010 in U.S. Appl. No. 11/237,482.
Petaswitch Solutions, Inc., Company Overview, 2001, http://www.peta-switch.com/markets/overview.htm.
"Petaswitch Solutions, Inc., The Pisces Chipset, Product Brief, 2001,http://www.peta-switch.com/products/product_brief.htm.".
Petaswitch Solutions. Inc., PetaSwitch Solutions Announces Raising $4 Million in First Round Financing. Press Release. 2001, http://peta-switch.com/newsroom/press_releases.htm.
Gupta, Scheduling in Input Queued Switches: A Survey. Jun. 1996. Department of Computer Science, Stanford University, California.
Schoenen, et at., Distributed Cell Scheduling Algorithms for Virtual-Output-Queued Switches, Dec. 1999. pp. 1211-1215. vol. 1, GLOBECOM, IEEE Global Telecommunications Conference.
Fahmy. A Survey of ATM Switching Techniques, Aug. 14, 2001. Department of Computer and Information Science, The Ohio State University.
Stiliadis, et al, Rate-Proportional Servers: A Design Methodology for Fair Queueing Algorithms, Dec. 1995, Computer Engineering & Information Sciences, University of California, Santa Cruz.

* cited by examiner

REORDERING PACKETS

RELATED APPLICATION INFORMATION

This patent application is a continuation of U.S. patent application Ser. No. 11/237,482, filed Sep. 27, 2005, now pending, which is a continuation of U.S. patent application Ser. No. 10/044,244, filed Jan. 11, 2002, now U.S. Pat. No. 6,967,951, issued Nov. 22, 2005, all of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to reordering packets.

2. Description of the Related Art

Communications networks now require handling of data at very high data rates. For example, 10 gigabits per second (Gbps) is common. When it is required to process data at these speeds, multiple high-speed parallel connections may be used to increase the effective bandwidth. However, this may result in one or more transmission problems, since the data streams must be divided to be distributed over the multiple parallel connections, and then at some point after parallel transmission, recombined to form the original streams.

DESCRIPTION OF DRAWINGS

The foregoing aspects and the attendant advantages of this invention will become more readily apparent by reference to the following detailed description when taken in conjunction with the accompanying drawings wherein.

DETAILED DESCRIPTION OF PREFERRED EMBODIMENT

The present invention includes a system for reordering sequenced based packets in a switching network. For example, in one embodiment of the invention, a reordering system is provided that receives packets from multiple sources and reorders the received packets based on a time stamp associated with each packet. Thus, various embodiments of the system included in the present invention are discussed in detail in the following text.

Exemplary Embodiment

Figure 1:
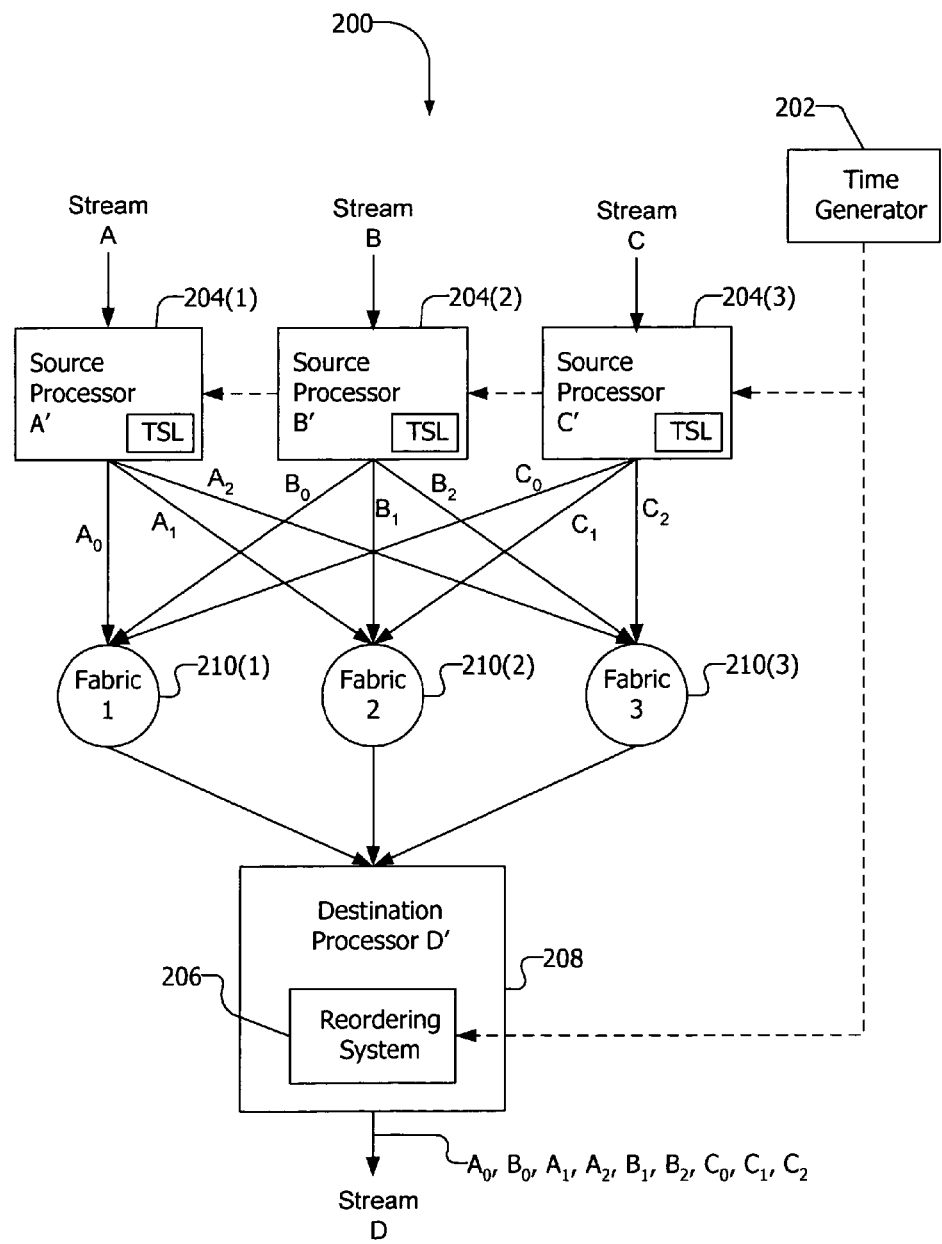
FIG. 1 shows a diagram showing one embodiment of a system for reordering frames.

FIG. 1 shows a diagram of one embodiment of a system 200 for reordering frames in accordance with the present invention. The system 200 includes a time generator 202 that provides time information to a number of source processors 204 and at least one destination processor 208, so that all processors have synchronized time signals available. In another embodiment, the source and destination processors include time generators and the time generators are synchronized, so that the source and destination processors operate using identical timing signals.

During operation of the system 200, the source processors 204 receive data streams (A, B, C) containing data frames. The source processors operate to give each of the data frames a time stamp prior to transmitting them to the destination processor via multiple communication fabrics 210.

In one embodiment of the invention, the source processors also assign a priority to each frame in addition to the time stamp. Thus, each frame that is transmitted via the fabrics 210 includes timing, and optionally, priority information.

Any technique can be used to include time stamps and/or priority information with the data frames. For example, in one embodiment, the source processors include time stamp logic (TSL) that stamps each data frame with a time stamp prior to transmission.

The time stamp logic (TSL) at each source processor is coupled to the time generator 202 so that the time stamp logic for all source processors are synchronized together. However, any technique to synchronize the time stamp logic for all source processors and the destination processor can be used.

Furthermore, the time stamp logic (TSL) can include a priority indicator with each frame. The priority indicator can be selected to be one of several priority levels.

Thus, any suitable technique can be used within the scope of the invention to associate timing and priority information with each data frame prior to transmission. For example, the TSL may comprise any type of CPU, processor, gate array or other type of hardware and/or associated software to provide time stamps and priority to the frames prior to transmission to the destination processor.

The system 200 also includes a reordering system 206 at the destination processor 208. The reordering system 206 operates to receive the frames from the fabrics 210 and process the frames based on their respective time stamps (and priority) to reorder the frames. The frames are reordered so that with respect to the transmission from each source processor, the frames are placed in an identical order as when transmitted. Thus, stream D includes all the frames in correct order with respect to their transmitting source processor.

Figure 2:
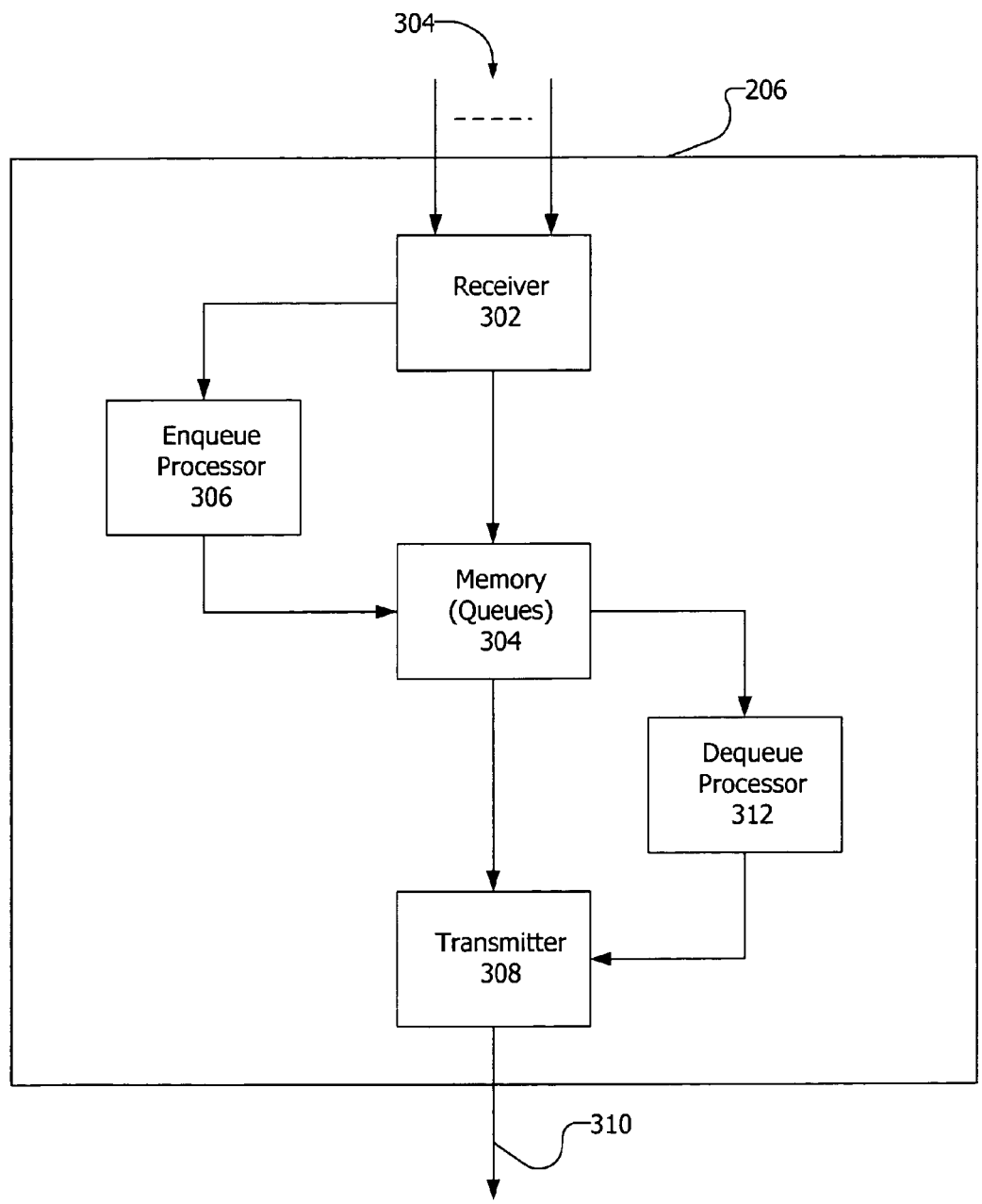
FIG. 2 shows a diagram of one embodiment of a reordering processor.

FIG. 2 shows a diagram of one embodiment of the reordering system 206 constructed in accordance with the present invention. The reordering system 206 forms part of the destination processor 208 and operates to provide reordering of frames in accordance with the invention. However, the source and destination processors may operate on the data frames in other ways to facilitate their transmission. These other processes will not be described in detail herein since they are not essential to the operation of the one or more embodiments of the invention. For example, the destination processor may serialize the frames for transmission, or provide known error detection and correction processes that are independent from the reordering system.

A receiver 302 receives one or more streams 304 that arrived at the destination processor. For example, the receiver 302 receives the streams transmitted to the destination via the fabrics 210. The receiver 302 is coupled to a memory 304 that includes memory queues, so that each of the received frames may be stored in the memory and corresponding memory pointers may be placed in selected memory queues.

An Enqueue processor 306 is coupled to both the receiver 302 and the memory 304, so that the Enqueue processor 306 can control the process of storing the frames of data in the memory and loading memory pointers to the stored frames into the memory queues. The Enqueue processor may comprise any suitable hardware such as a CPU, gate array or other hardware logic, and may also include any suitable software to operate in conjunction with the hardware.

The memory 304 is coupled to a transmitter 308 that receives the frames as they are transferred out of the memory 304 in the correct order in accordance with the present invention. In one embodiment, the memory queues function as first-in-first-out memory queues. Thus, as the data frames are received and stored into memory, the pointers associated with the stored frames are loaded into the memory queues and flow through the memory queues to queue outputs. Thus, the first pointer loaded into a selected memory queue will be the first to appear at the respective queue output.

In one embodiment, the transmitter 308 transmits the frames in a single stream 310 toward their final destination. In another embodiment, the transmitter may transmit the stream 310 over several communication fabrics to the next destination. For example, the transmitter may transmit the stream 310 into multiple other communication fabrics that are coupled to the next destination.

A Dequeue processor 312 is coupled to the memory 304 and the transmitter 308. The Dequeue processor operates to control the reordering of frames and to retrieve the frames from the memory and transfer them to the transmitter 308. For example, in one embodiment, the Dequeue processor operates to control the transfer of frames from the memory based on information stored in the memory queues. For example, in one embodiment, the memory queues include the time stamp and/or priority associated with each pointer associated with a stored frame. The time stamp and priority information is used to determine the order of frames retrieved from the memory. The Dequeue processor may comprise any suitable hardware such as a CPU, gate array or other hardware logic, and may also include any suitable software to operate in conjunction with the hardware.

The Dequeue processor operates to process the time stamps associated with received data frames to determine the order that the received frames can be retrieved from the memory and transferred to the transmitter 308 for output to the next destination. For example, the Dequeue processor evaluates the time stamps available at the queue outputs to determine the memory pointer associated with the earliest time stamp. This memory pointer is used to retrieve the next frame from memory to be transferred to the transmitter 308 for output to the next destination.

In a configuration where multiple priority levels are used, a memory queue is used for each priority level associated with each communication fabric. The Dequeue processor operates to evaluate the time stamps and priority of all the queue outputs to determine the order of frames to transfer to the transmitter 308 for output to the next destination. However, in this configuration, the Dequeue processor operates to select frames having a higher priority before frames having a lower priority. Thus, in one embodiment, the Dequeue processor operates to evaluate time stamps associated with the highest priority frames to determine the frame having the earliest time stamp for output. This process occurs even though lower priority frames may have an earlier time stamp. Thus, the Dequeue processor operates to give preference to higher priority frames.

In one or more other embodiments included in the present invention, the Dequeue processor operates to implement a selection process for selecting a frame from both high and low priority frames. For example, if a low priority frame is time stamped earlier (by a selectable interval), than a higher priority frame, then the lower priority frame will be selected for output. Thus, the Dequeue processor may operate to implement any type of selection algorithm to select a frame for output from both low and high priority frames.

Another function performed by the Dequeue processor during the reordering process is to compensate for transmission latency through the fabrics. For example, as frames are transmitted from source to destination, they may be delayed as they flow through the communication fabrics. For example, in one situation, a later stamped frame may arrive at the destination before an earlier stamped frame.

To compensate for transmission latency, the Dequeue processor uses the time stamp information provided with received frames. For example, the source processors operate to time stamp the frames (when transmitted) with a value that accounts for the current time plus a transmission time latency parameter. As the frames are received at the destination, their time stamps and associated memory pointers are placed in selected memory queues. The Dequeue processor evaluates the time stamps at the queue outputs to determine which frame is to be retrieved from memory and output. However, if a later stamped frame flows through its transmission fabric quickly, it may be received at the destination before an earlier stamped frame that has been delayed in its transmission fabric. Without accounting for the transmission latency, the later stamped frame may be output before the earlier stamped frame, and so, the frames will not be reordered properly.

To avoid the possibility of a later stamped frame being output before an earlier stamped frame, the Dequeue processor operates to wait before outputting the selected frame until the current time (at the destination) reaches the time stamp value of the frame. This wait time operates to allow earlier stamped frames to flow through their respective communication fabric so that they can be received at the destination. When an earlier stamped frame is received at the destination within the wait time, the Dequeue processor operates to select this earlier stamped frame before the later stamped frame. Thus, the Dequeue processor compensates for transmission latencies to form the reordered output stream.

In the above-described embodiment, the source processors include a transmission latency parameter in the time stamp associated with each transmitted frame. Thus, the Dequeue processor needs only to wait until the current time at the destination reaches the time stamp value. In other embodiments, the source processors time stamp their transmitted frames with the current time at transmission. In this case, the Dequeue processor adds the transmission latency parameter to each time stamp to form a new time stamp, and waits until the current time reaches this new time stamp before outputting a selected frame. Thus, the latency time parameter allows data frames that might be delayed in transmission to be received at the destination for inclusion in the reordered output stream. Although two methods of compensating for transmission latency have been described, any method to account for transmission latency may be included for use in the reordering system 206 in accordance with the present invention.

Figure 3:
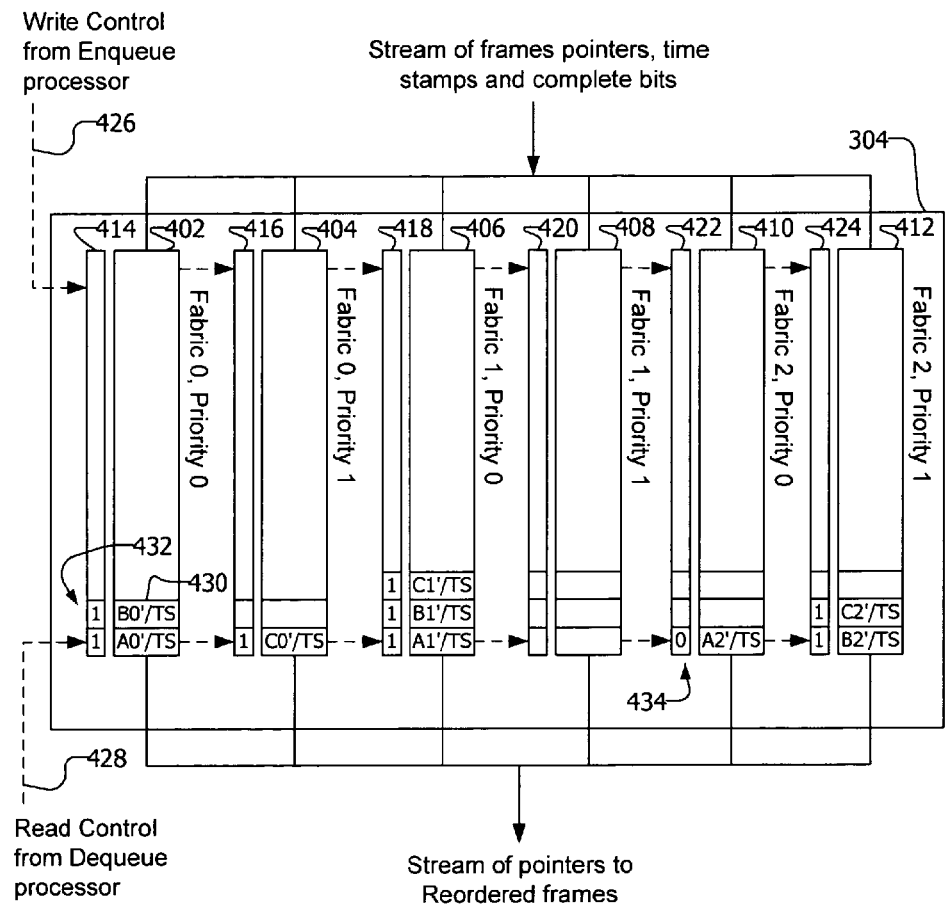
FIG. 3 shows a diagram of a memory for use in a reordering system.

FIG. 3 shows a portion of one embodiment of the memory 304 for use in the reordering system 206 in accordance with the present invention. The memory 304 includes a memory portion (not shown) and individual queues (402, 404, 406, 408, 410, 412) that are defined to store specific pointers to frames of received data that are stored in the memory portion. The memory portion may be any type of memory suitable for storing and retrieving frames of received data. The individual queues are allocated based on the number of communication fabrics and priority levels used. For example, queue 402 is used to store pointers to frames received from fabric 0 that have a priority of zero. Queue 404 is used to store pointers for frames received from fabric 0 that have a priority of one. Queues 406, 408, 410 and 412 are also defined to store pointers for frames received from selected fabrics and having selected priority levels, as shown. Also included in the memory 304 are complete bit queues 414-424 that are associated with the memory queues 402-412, respectively. The complete bit queues are used to store complete bits associated with the received data frames.

Both the memory queues and the complete bit queues are coupled to a write control line 426 that provides write control signals to allow information about the frames received at the receiver 302 to be written into the queues. The write control line 426 is coupled to the Enqueue processor 306, thereby allowing the Enqueue processor to control the write operations.

The memory queues and the complete bit queues are also coupled to a read control line 428 that provides read control signals to allow the information about the frames stored in the queues to be retrieved for processing. The read control line 428 is coupled to the Dequeue processor 312, thereby allowing the Dequeue processor to control the read operations.

As shown in FIG. 3, queue 402 has stored in it pointers (A0', B0') that point to locations in the memory where frames A0 and B0 are stored. For example, the pointer B0', shown at 430, points to where frame B0 is stored in the memory. Included with each frame pointer is a time stamp (TS) that was added to the frame by the source processor that transmitted the frame. Thus, each received frame at the destination processor is processed by the reordering system so that the frame data is stored in memory and a pointer to the frame data and the associated time stamp information is entered into a particular queue. The particular queue is the queue associated with the transmission fabric on which the frame was transmitted, and optionally, a priority indicator.

Referring again to FIG. 3, with regards to the queues for fabric 1, there are no priority 1 frames, so that that queue is empty as shown. With regards to the queues for fabric 2, there is one priority 0 frame and two priority 1 frames. Thus, during operation, the queues are filled with pointers to received frames of data as the frames are received at the destination processor. The complete bit queues indicate whether a complete frame has been received. For example, the frames A0 and B0 have been completely received at the destination as indicated by the corresponding "1's" entered in the complete bit queue 414, as shown at 432. However, the frame A2 has not been completely received as indicated by the "0" in the complete bit queue 422, as shown at 434.

Figure 4:
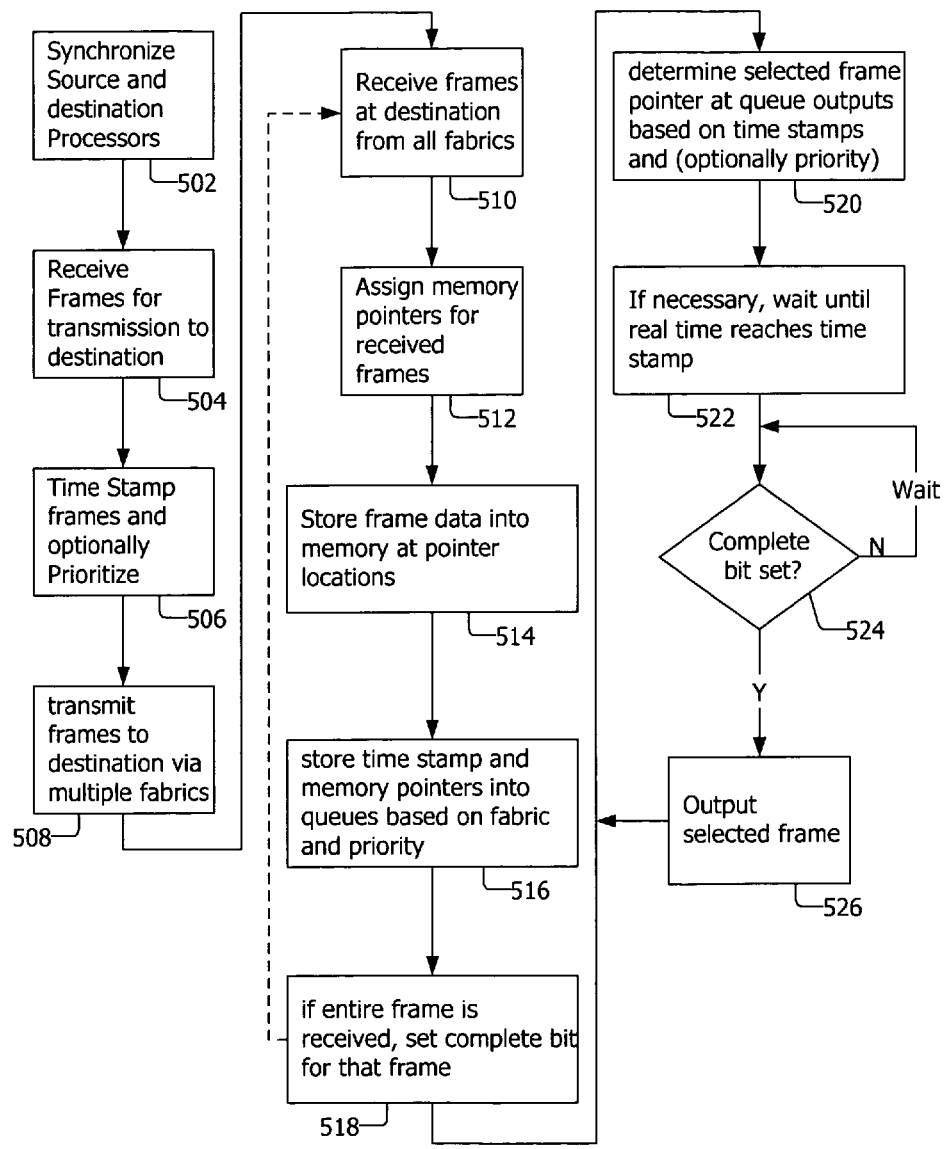
FIG. 4 shows a flow diagram for a method for reordering frames.

FIG. 4 shows a flow diagram 500 for one embodiment of a method for reordering frames in accordance with the present invention. At block 502, source and destination processors are synchronized so that they each have identical timing signals. For example, the source and destination processors may receive the same timing signals, or include independent timing apparatus that are synchronized to the same time source.

At block 504, streams of frames are received at the source processors for transmission over multiple fabrics to at least one destination processor. At block 506, the frames received at each source processor are time stamped and optionally encoded with a priority level. In one embodiment of the invention, the received frames are time stamped with a value that accounts for transmission latency time. For example, if a frame is transmitted from a source processor at time (5) and the expected transmission latency through the communication fabric to the destination is (10), then the frame is time stamped with a value of (15). In another embodiment included in the present invention, the frame is time stamped with a value that reflects when it was transmitted from the source processor, and the destination processor operates to account for the transmission latency of the communication fabric.

At block 508, the sources transmit streams of time stamped frames, via multiple communication fabrics, to at least one destination processor. At block 510, the streams of time stamped frames are received at the destination processor.

At block 512, memory pointers are assigned to the streams of time stamped frames received at the destination processor. At block 514, the memory pointers are used to store the data associated with the received frames into memory. At block 516, the memory pointers and time stamps associated with the received frames are loaded into queues based on the transmission fabric, and optionally, the priority associated with each frame. For example, the number of queues used is determined by the number of transmitting fabrics and the frame prioritization. For example, if there are three transmitting fabrics and two levels of priority, then six memory queues are used.

At block 518, if an entire frame is received, an associated complete bit is set to indicate that the frame has been completely received at the destination. For example, if a frame is being received at the destination from a selected fabric, the assigned memory pointer and time stamp associated with the frame are entered into the correct queue. When the frame is completely received, a complete bit is entered into a complete bit queue that is also associated with the selected queue.

The above method steps are used in one embodiment of a reordering system constructed in accordance with the present invention to time stamp and transmit frames of data from source processors to a destination processor via multiple communication fabrics. The above method steps are used to receive and store time stamped frames of data at a destination processor. The following steps are used to perform reordering of those received frames in accordance with the present invention.

At block 520, a determination is made to determine a selected frame pointer at the queue outputs to be used to access a data frame for output from the destination. For example, the queue outputs show frame pointers and time stamps associated with data frames stored in a memory at the destination. The time stamps (and optional priority) are used to determine the pointer associated with the earliest stamped frame and having a selected priority level. Thus, it is possible for the Dequeue processor to determine which frame pointer to use to output the data having the earliest time stamp and selected priority level.

At block 522, once a frame has been selected for output, a wait period may be performed, if necessary, to give time for any missing frames having an earlier time stamp to be received at the destination. For example, due to the latency going through a fabric, one or more frames may be delayed for a certain time period from reaching the destination processor. In one embodiment of the invention, the frames are time stamped with a value that incorporates a transmission latency time. During reordering at the destination processor, the Dequeue processor selects the pointer from the memory queues having the earliest time stamp for output. The Dequeue processor then waits, if necessary, until the real time reaches the time stamp value associated with the selected frame. By waiting for the latency time to expire, the Dequeue processor assures that any frame delayed in transmission will arrive at the destination. Thus, earlier time stamped frames will not be bypassed in the reordered output.

In another embodiment included in the present invention, the frames are stamped with a transmission time at the source processor and the Dequeue processor adds a selected transmission latency time to the transmission time to determine how long to wait for potentially delayed frames. Thus, waiting until the transmission latency is accounted for allows delayed frames with earlier time stamps to be received at the destination for inclusion in the reordered output.

At block 524, a determination is made to determine whether or not the selected frame has been completely received by checking its associated complete bit. For example, when the selected frame is completely received, its associated complete bit in the complete bit queue will be set to a "1." If the complete bit is not set to a "1" then the method proceeds back to block 524 waiting for the selected frame to be completely received. If the complete bit for the selected frame is set to a "1", then the selected frame has been completely received and the method proceeds to block 526.

At block 526, the selected frame is retrieved from the memory using the address pointer at the output of the memory queue. In one embodiment, a determination between two or more frames is based on the respective priority of the frames. For example, if two frames from different sources have identical or almost identical time stamps, then their respective priority value can be used to determine which one will be output first. The retrieved data frame is then transferred to the transceiver where it is output to its next destination.

After outputting a frame at block 526, the method proceeds to block 520 where a next frame for output is determined based on the time stamps at the memory queue outputs. The method continues to receive data and determine the frames to output by repeating the above processes.

In accordance with the present invention, frames transmitted from a particular source are reordered to have the same order as when initially transmitted. Therefore, one or more embodiments included in the present invention provide a system for reordering frames in a switching network.

The present invention includes a system for reordering sequenced based packets in a switching network. The embodiments described above are illustrative of the present invention and are not intended to limit the scope of the invention to the particular embodiments described. Accordingly, while several embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

It is claimed:

1. An apparatus, comprising:
a first processor, configured for:
directing a plurality of packets in a plurality of queues and corresponding order information about the plurality of packets in the plurality of queues,
wherein the corresponding order information for individual packets in the plurality of packets comprises a time stamp assigned by a second processor and a priority value assigned by the second processor.

2. The apparatus of claim 1, wherein the first processor is further configured to generate a write control signal, and wherein the write control signal is configured to control a write operation of the plurality of queues.

3. The apparatus of claim 2, wherein the write operation of the plurality of queues comprises writing information about the plurality of packets into the plurality of queues.

4. The apparatus of claim 1, wherein the directing the plurality of packets comprises:
storing the plurality of packets; and
loading pointers to the plurality of packets into the plurality of queues.

5. The apparatus of claim 1, wherein the time stamp indicates a time that the packet was transmitted.

6. The apparatus of claim 1, wherein the time stamp accounts for a transmission latency time.

7. The apparatus of claim 1, wherein the corresponding order information further comprises a transmission latency parameter.

8. The apparatus of claim 1, wherein the first processor is further configured to be coupled to a memory, and wherein the memory is configured to store at least the plurality of packets in the plurality of queues.

9. The apparatus of claim 1, wherein the time stamp indicates a timing synchronization function.

10. An apparatus, comprising:
a first processor, configured for:
receiving a plurality of packets and corresponding order information from a plurality of queues,
determining an order for outputting the plurality of packets in accordance with the corresponding order information, wherein the corresponding order information for individual packets in the plurality of packets comprises a time stamp assigned by a second processor and a priority value assigned by the second processor, and
accessing the plurality of packets in the plurality of queues for output as data streams.

11. The apparatus of claim 10, wherein the first processor is further configured to be coupled to a transmitter, and wherein the transmitter is configured to transmit the data streams.

12. The apparatus of claim 10, wherein the first processor is configured to determine the order for outputting for a first given packet of the plurality of packets and a second given packet of the plurality of packets based on the respective time stamp and the priority value of the first and second given packets.

13. The apparatus of claim 12, wherein the priority value of the first given packet is higher than the priority value of the second given packet,
wherein the time stamp of the second given packet is earlier than the time stamp of the first given packet, and
wherein the order for outputting the plurality of packets includes outputting the first given packet before the second given packet based on the priority value of the first given packet being higher than the priority value of the second given packet.

14. The apparatus of claim 12, wherein the priority value of the first given packet is higher than the priority value of the second given packet,
wherein the time stamp of the second given packet is earlier than the time stamp of the first given packet, and
wherein the order for outputting the plurality of packets includes outputting the second given packet before the first given packet based on the time stamp of the second given packet being earlier than the time stamp of the second given packet.

15. The apparatus of claim 12, wherein the time stamp indicates a time that the packet was transmitted.

16. The apparatus of claim 10, wherein the time stamp accounts for a transmission latency time.

17. The apparatus of claim 10, wherein the corresponding order information further comprises a transmission latency parameter.

18. The apparatus of claim 10, wherein the first processor is further configured to generate a read control signal, and wherein the read control signal is configured to control a read operation of the plurality of queues.

19. The apparatus of claim 10, wherein the time stamp indicates a timing synchronization function.

20. A method, comprising:
determining, at a reordering system, corresponding order information about a plurality of packets, wherein the corresponding order information for at least one packet of the plurality of packets includes a time stamp assigned by a source processor and a priority value assigned by the second processor;
determining, at the reordering system, an order for outputting the plurality of packets as a data stream in accordance with the corresponding order information;
accounting, at the reordering system, for transmission latency for at least one packet of the plurality of packets in the data stream; and
responsively outputting the data stream from the reordering system.

21. The method of claim 20, wherein the corresponding order information further comprises a transmission latency parameter for the at least one packet, and wherein accounting for transmission latency for the at least one packet comprises accounting for transmission latency based on the transmission latency parameter for the at least one packet.

22. The method of claim 21, wherein accounting for transmission latency based on the transmission latency parameter for the at least one packet comprises updating the time stamp for the at least one packet based on the transmission latency parameter for the at least one packet.

23. The method of claim 22, wherein updating the time stamp for the at least one packet based on the transmission latency parameter for the at least one packet comprises adding the transmission latency parameter for the at least one packet to the time stamp for the at least one packet.

24. The method of claim 22, wherein responsively outputting the data stream comprises:
waiting until a current time reaches a time corresponding to the updated time stamp for the at least one packet; and
after the current time reaches the time corresponding to the updated time stamp, outputting the at least one packet as part of the data stream.

25. The method of claim 20, wherein accounting for transmission latency for the at least one packet comprises receiving a time stamp indicating the time the at least one packet was transmitted adjusted for transmission latency time.

26. The method of claim 20, wherein the time stamp indicates a time that the packet was transmitted.

27. The method of claim 20, wherein the time stamp indicates a timing synchronization function.

28. An apparatus, comprising:
a central processing unit (CPU);
memory;
software, stored in the memory that, in response to execution by the CPU, causes the apparatus to perform operations comprising:
determining corresponding order information about the packets, wherein the corresponding order information for at least one packet of the packets includes a time stamp assigned by a second processor and a priority value assigned by the second processor,
determining, in accordance with the corresponding order information, an order for outputting the packets as a data stream,
accounting for transmission latency for the at least one packet in the data stream, and
responsively outputting the data stream.

29. The apparatus of claim 28, wherein the corresponding order information further comprises a transmission latency parameter for the at least one packet, and wherein accounting for transmission latency for the at least one packet comprises accounting for transmission latency based on the transmission latency parameter for the at least one packet.

30. The apparatus of claim 29, wherein accounting for transmission latency based on the transmission latency parameter for the at least one packet comprises updating the time stamp for the at least one packet based on the transmission latency parameter for the at least one packet.

31. The apparatus of claim 30, wherein updating the time stamp for the at least one packet based on the transmission latency parameter for the at least one packet comprises adding the transmission latency parameter for the at least one packet to the time stamp for the at least one packet.

32. The apparatus of claim 30, wherein responsively outputting the data stream comprises:
waiting until a current time reaches a time corresponding to the updated time stamp for the at least one packet; and
after the current time reaches the time corresponding to the updated time stamp, outputting the at least one packet as part of the data stream.

33. The apparatus of claim 28, wherein accounting for transmission latency for the at least one packet comprises receiving a time stamp indicating the time the at least one packet was transmitted adjusted for transmission latency time.

34. The apparatus of claim 28, wherein the time stamp indicates a time that the packet was transmitted.

35. The apparatus of claim 28, wherein the time stamp indicates a timing synchronization function.

* * * * *

UNITED STATES PATENT AND TRADEMARK OFFICE
CERTIFICATE OF CORRECTION

PATENT NO. : 8,107,377 B2
APPLICATION NO. : 12/759221
DATED : January 31, 2012
INVENTOR(S) : Alfano It is certified that error appears in the above-identified patent and that said Letters Patent is hereby corrected as shown below:

On Title Page 2, Item (56), under "Other Publications", Line 4, below "09/930,804."
insert -- USPTO; Office Action dated Dec. 14, 2004 in U.S. Appl. No. 09/930,804. --.

On Title Page 2, Item (56), under "Other Publications", Line 48, delete "et at.," and insert -- et al., --.

On Title Page 2, item (56), under "Other Publications", Line 51, delete "ofATM" and
insert -- of ATM --.

Column 1, lines 6-7, delete "2005, now pending, which" and insert -- 2005, now U.S. Pat. No. 7,856,011, which --.

Signed and Sealed this
Tenth Day of July, 2012

David J. Kappos
*Director of the United States Patent and Trademark Office*